(12) United States Patent
Gerlings et al.

(10) Patent No.: US 10,661,359 B2
(45) Date of Patent: *May 26, 2020

(54) KEY DUPLICATION MACHINE HAVING PIVOTING CLAMP

(71) Applicant: THE HILLMAN GROUP, INC., Cincinnati, OH (US)

(72) Inventors: Phillip Gerlings, Chandler, AZ (US); Michael Schmidt, Gilbert, AZ (US); Lawrence Perea, Albuquerque, NM (US)

(73) Assignee: The Hillman Group, Inc., Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,358

(22) Filed: Sep. 9, 2019

(65) Prior Publication Data

US 2020/0001378 A1    Jan. 2, 2020

Related U.S. Application Data (63) Continuation of application No. 15/699,610, filed on Sep. 8, 2017, now Pat. No. 10,406,607.

(60) Provisional application No. 62/393,905, filed on Sep. 13, 2016.

(51) Int. Cl.
  *B23C 3/35*    (2006.01)
(52) U.S. Cl.
  CPC .......... *B23C 3/355* (2013.01); *B23C 2235/12* (2013.01); *B23C 2235/32* (2013.01); *B23C 2235/41* (2013.01); *Y10T 409/300952* (2015.01)

(58) Field of Classification Search
  CPC ....... B23C 3/35; B23C 3/355; B23C 2235/12; B23C 2235/41; Y10T 409/300952; Y10T 409/301008; Y10T 409/301064
  See application file for complete search history.

(56) References Cited

U.S. PATENT DOCUMENTS

| | | | |
|---|---|---|---|
| 488,058 A | 12/1892 | Breed | |
| 1,135,676 A | 4/1915 | Engelbert | |
| 1,165,099 A | 12/1915 | Hoernel | |
| 1,243,810 A | 10/1917 | Christoph | |
| 1,400,678 A | 12/1921 | Holbrook | |
| 1,422,155 A | 7/1922 | Wetherholt | |
| 1,462,150 A | 7/1923 | Segal | |

(Continued)

FOREIGN PATENT DOCUMENTS

| CA | 2365738 A1 | 9/2000 |
|---|---|---|
| DE | 102005027102 A1 | 12/2006 |

(Continued)

OTHER PUBLICATIONS

Byron Grice et al., U.S. Appl. No. 15/711,748 entitled "Identification Module for Key Making Machine" filed Sep. 21, 2017.

(Continued)

*Primary Examiner* — Alan Snyder
*Assistant Examiner* — Yasir A Diab
(74) *Attorney, Agent, or Firm* — Finnegan, Henderson, Farabow, Garrett & Dunner, LLP (57) ABSTRACT

A clamp is disclosed for a key making machine. The clamp may have an anvil, and a door movable toward the anvil to sandwich a key blank therebetween. The clamp may also have a gate pivotally connected to the door and configured to engage the key blank.

20 Claims, 5 Drawing Sheets

(56) References Cited

U.S. PATENT DOCUMENTS

| | | |
|---|---|---|
| 1,587,181 A | 6/1926 | Pomeroy et al. |
| 1,614,852 A | 1/1927 | Scharf |
| 1,656,295 A | 1/1928 | Schechter |
| 1,697,747 A | 1/1929 | Bachmann |
| 1,752,668 A | 4/1930 | Johnson |
| 1,800,209 A | 4/1931 | Christopherson |
| 1,811,922 A | 6/1931 | Falk |
| 1,869,631 A | 8/1932 | Swanson |
| 2,095,196 A | 10/1937 | Paquette |
| 2,148,667 A | 2/1939 | Yoskowitz et al. |
| 2,682,809 A | 7/1954 | May |
| 2,712,769 A | 7/1955 | Prescott |
| 2,821,064 A | 1/1958 | Nelson |
| 3,116,665 A | 1/1964 | Reisner |
| 3,265,245 A | 8/1966 | Harden |
| 3,323,420 A | 6/1967 | Roxburgh |
| 3,358,561 A | 12/1967 | Roxburgh et al. |
| 3,413,892 A | 12/1968 | Casey et al. |
| 3,442,174 A | 5/1969 | Weiner et al. |
| 3,496,636 A | 2/1970 | Lieptz |
| 3,602,092 A | 8/1971 | Richens |
| 3,682,041 A | 8/1972 | Essig |
| 3,748,940 A | 7/1973 | Muri |
| 3,780,550 A | 12/1973 | Simorghi |
| 3,796,130 A | 3/1974 | Gartner |
| 3,797,291 A | 3/1974 | Simorghi |
| 3,865,011 A | 2/1975 | Patriquin |
| 3,978,764 A | 9/1976 | Patriquin |
| 4,055,880 A | 11/1977 | Moessner |
| 4,159,783 A | 7/1979 | Crasnlanski |
| 4,235,087 A | 11/1980 | Bianchi |
| 4,294,096 A | 10/1981 | Heimann |
| 4,353,561 A | 10/1982 | Peterson |
| 4,666,351 A | 5/1987 | Marchal |
| 4,741,652 A | 5/1988 | Marchal |
| 4,752,876 A | 6/1988 | Couch et al. |
| 4,899,391 A | 2/1990 | Cimino et al. |
| 4,901,548 A | 2/1990 | Deslandes |
| 5,167,171 A | 12/1992 | Heredia |
| 5,172,829 A | 12/1992 | Dellicker, Jr. |
| 5,351,409 A | 10/1994 | Heredia |
| 5,383,345 A | 1/1995 | Kallinger-Prskawetz-Jacobsen |
| 5,443,339 A | 8/1995 | Heredia et al. |
| 5,496,138 A | 3/1996 | Drori |
| 5,538,374 A | 7/1996 | Cole et al. |
| 5,538,534 A | 7/1996 | Cole et al. |
| 5,546,316 A | 8/1996 | Buckley et al. |
| 5,556,240 A | 9/1996 | Almblad |
| 5,569,003 A | 10/1996 | Goldman et al. |
| 5,607,267 A | 3/1997 | Heredia et al. |
| 5,660,509 A | 8/1997 | Cole et al. |
| 5,671,523 A | 9/1997 | Juchinewicz |
| 5,676,504 A | 10/1997 | Mueller et al. |
| 5,739,766 A | 4/1998 | Chaloux |
| 5,764,156 A | 6/1998 | Chaloux |
| 5,771,176 A | 6/1998 | Froehlich et al. |
| 5,807,042 A | 9/1998 | Almblad et al. |
| 5,833,406 A | 11/1998 | Chies et al. |
| 5,844,808 A | 12/1998 | Konsmo et al. |
| 5,906,365 A | 5/1999 | Wu |
| 5,908,273 A | 6/1999 | Titus et al. |
| 5,951,218 A | 9/1999 | Wu |
| 5,956,985 A | 9/1999 | Chang |
| 5,964,554 A | 10/1999 | Drori |
| 5,974,844 A | 11/1999 | Harrelson et al. |
| 5,997,224 A | 12/1999 | Beauregard et al. |
| 6,064,747 A | 5/2000 | Wills et al. |
| 6,065,911 A | 5/2000 | Almblad et al. |
| 6,106,131 A | 8/2000 | Hao |
| 6,152,662 A | 11/2000 | Titus et al. |
| 6,185,311 B1 | 2/2001 | Yanovsky et al. |
| 6,237,756 B1 | 5/2001 | Caudle |
| 6,371,286 B1 | 4/2002 | Montanari |
| 6,406,227 B1 | 6/2002 | Titus et al. |
| 6,449,381 B1 | 9/2002 | Yanovsky et al. |
| 6,543,972 B1 | 4/2003 | Cimino |
| D475,195 S | 6/2003 | Christianson |
| 6,588,995 B2 | 7/2003 | Wills et al. |
| 6,595,045 B1 | 7/2003 | Fuglewicz et al. |
| 6,602,030 B1 | 8/2003 | Markbreit |
| 6,641,339 B2 | 11/2003 | Chies et al. |
| 6,647,308 B1 | 11/2003 | Prejean |
| 6,651,470 B1 | 11/2003 | Rafter |
| 6,684,673 B2 | 2/2004 | Florendo |
| 6,782,725 B2 | 8/2004 | Linares |
| 6,801,829 B2 | 10/2004 | Kawai |
| 6,839,449 B1 | 1/2005 | Campbell et al. |
| 6,892,558 B2 | 5/2005 | Chodosh |
| 6,895,100 B1 | 5/2005 | Pacenzia et al. |
| 7,055,352 B2 | 6/2006 | Meyerson et al. |
| 7,077,607 B2 | 7/2006 | Foscan |
| 7,167,892 B2 | 1/2007 | Defosse et al. |
| 7,214,011 B2 | 5/2007 | Ryai, Sr. et al. |
| 7,380,428 B2 | 6/2008 | Morehart et al. |
| 7,387,476 B2 | 6/2008 | Ryai, Sr. |
| 7,527,458 B2 | 5/2009 | Ryai, Sr. et al. |
| D618,983 S | 7/2010 | Downes |
| 7,890,878 B2 | 2/2011 | Bass et al. |
| 7,891,919 B2 | 2/2011 | Bass et al. |
| 7,918,629 B2 | 4/2011 | Belflower et al. |
| 8,074,481 B2 | 12/2011 | Bass et al. |
| 8,126,764 B2 | 2/2012 | Murray et al. |
| 8,128,322 B2 | 3/2012 | Bass et al. |
| 8,142,117 B2 | 3/2012 | Belflower et al. |
| 8,191,779 B2 | 6/2012 | Illingworth et al. |
| 8,214,247 B2 | 7/2012 | Murray et al. |
| 8,215,625 B2 | 7/2012 | Wu |
| 8,225,696 B2 | 7/2012 | Downes |
| 8,287,215 B2 | 10/2012 | Freeman et al. |
| 8,292,556 B2 | 10/2012 | Ryai, Sr. et al. |
| D674,590 S | 1/2013 | Busch |
| 8,342,783 B2 | 1/2013 | Ryai, Sr. |
| 8,373,558 B2 | 2/2013 | Sagady et al. |
| 8,484,068 B2 | 7/2013 | Godwin et al. |
| 8,484,070 B2 | 7/2013 | Murray et al. |
| 8,532,809 B2 | 9/2013 | Freeman |
| 8,600,546 B1 | 12/2013 | Hagen et al. |
| 8,634,951 B2 | 1/2014 | Freeman |
| 8,992,145 B1 | 3/2015 | Mueller et al. |
| 9,073,133 B1 | 7/2015 | Mueller et al. |
| 9,149,877 B1 | 10/2015 | Mueller et al. |
| 9,243,426 B2 | 1/2016 | Gerlings et al. |
| 9,468,982 B1 | 10/2016 | Mueller et al. |
| 9,487,968 B2 | 11/2016 | Gerlings |
| 9,506,272 B2 | 11/2016 | Gerlings et al. |
| 9,556,649 B1 | 1/2017 | Mueller et al. |
| 9,558,236 B1 | 1/2017 | Hagen et al. |
| 9,580,932 B2 | 2/2017 | Gerlings et al. |
| 9,586,272 B1 | 3/2017 | Mueller et al. |
| 9,764,393 B2 | 9/2017 | Mueller et al. |
| 9,797,163 B2 | 10/2017 | Grice et al. |
| 2002/0022901 A1 | 2/2002 | Wetterlin et al. |
| 2002/0031251 A1 | 3/2002 | Campbell et al. |
| 2002/0141843 A1 | 10/2002 | Mueller et al. |
| 2004/0148988 A1 | 8/2004 | Taylor |
| 2004/0253067 A1 | 12/2004 | Bosch |
| 2005/0103070 A1 | 5/2005 | Meyerson |
| 2005/0241353 A1 | 11/2005 | Moening |
| 2006/0044109 A1 | 3/2006 | Griffits et al. |
| 2006/0048553 A1 | 3/2006 | Almquist |
| 2006/0090528 A1 | 5/2006 | Moening |
| 2007/0224008 A1 | 9/2007 | Bass et al. |
| 2008/0145163 A1 | 6/2008 | Freeman et al. |
| 2009/0228795 A1 | 9/2009 | Bass et al. |
| 2010/0052234 A1 | 3/2010 | Ryai, Sr. |
| 2010/0278437 A1 | 11/2010 | Thompson et al. |
| 2010/0278438 A1 | 11/2010 | Thompson et al. |
| 2010/0316250 A1 | 12/2010 | Perrigo |
| 2011/0110741 A1 | 5/2011 | Huss et al. |
| 2011/0164938 A1 | 7/2011 | Bass |
| 2011/0167377 A1 | 7/2011 | Bass et al. |
| 2011/0176881 A1 | 7/2011 | Bass et al. |
| 2011/0262240 A1 | 10/2011 | Mutch et al. |
| 2011/0297691 A1 | 12/2011 | Freeman |

(56) References Cited

U.S. PATENT DOCUMENTS

| | | |
|---|---|---|
| 2011/0301738 A1 | 12/2011 | Freeman |
| 2012/0014762 A1 | 1/2012 | Ryai, Sr. et al. |
| 2012/0038453 A1 | 2/2012 | Bass et al. |
| 2012/0154127 A1 | 6/2012 | Donadini |
| 2012/0213603 A1 | 8/2012 | Bass et al. |
| 2012/0243957 A1 | 9/2012 | Drake et al. |
| 2013/0017030 A1 | 1/2013 | Freeman et al. |
| 2013/0039714 A1 | 2/2013 | Ryai, Sr. et al. |
| 2013/0094918 A1 | 4/2013 | Ryai, Sr. |
| 2013/0170693 A1 | 7/2013 | Marsh et al. |
| 2013/0294857 A1 | 11/2013 | Bass et al. |
| 2013/0331976 A1 | 12/2013 | Freeman et al. |
| 2014/0113683 A1 | 4/2014 | Hickey |
| 2014/0377027 A1 | 12/2014 | Burkett et al. |
| 2015/0050094 A1 | 2/2015 | Gerlings |
| 2016/0004892 A1 | 1/2016 | Marsh et al. |
| 2016/0114412 A1 | 4/2016 | Bosch |
| 2016/0321632 A1 | 11/2016 | Moore et al. |
| 2016/0346847 A1 | 12/2016 | Gerlings |
| 2017/0008096 A1 | 1/2017 | Mueller et al. |
| 2017/0100785 A1 | 4/2017 | Hagen et al. |
| 2017/0103516 A1 | 4/2017 | Mueller et al. |
| 2017/0136557 A1 | 5/2017 | Huss et al. |
| 2017/0225242 A1 | 8/2017 | Spangler et al. |

FOREIGN PATENT DOCUMENTS

| | | |
|---|---|---|
| DE | 202012100455 U1 | 3/2012 |
| EP | 0362007 A2 | 4/1990 |
| EP | 0709154 | 5/1996 |
| EP | 1338732 | 8/2003 |
| EP | 2000303 | 12/2008 |
| EP | 2517826 | 10/2012 |
| GB | 191403275 A | 6/1914 |
| GB | 2276106 A | 9/1994 |
| WO | WO 89/012867 | 12/1989 |
| WO | WO 93/006959 | 4/1993 |
| WO | WO 02/001480 | 1/2002 |
| WO | WO 02/101180 A2 | 12/2002 |
| WO | WO 2007/093982 | 8/2007 |

OTHER PUBLICATIONS

"Green Curtain Projects Confidential", Dec. 2009.
International Preliminary Report on Patentability dated Feb. 16, 2016 listing PCT/US2014/049740 filed Aug. 5, 2014.
International Preliminary Report on Patentability dated Feb. 16, 2016 listing PCT/US2014/049901 filed Aug. 6, 2014.
International Preliminary Report on Patentability dated Feb. 16, 2016 listing PCT/US2014/050047 filed Aug. 7, 2014.
International Search Report dated Nov. 12, 2014 listing PCT/US2014/049740 filed Aug. 5, 2014.
International Search Report dated Nov. 12, 2014 listing PCT/US2014/049901 filed Aug. 6, 2014.
International Search Report dated Nov. 12, 2014 listing PCT/US2014/050047 filed Aug. 7, 2014.
Office Action in U.S. Appl. No. 15/235,361 dated Feb. 22, 2018; 7 pages.
Office Action in U.S. Appl. No. 15/414,323 dated Mar. 20, 2018; 17 pages.

KEY DUPLICATION MACHINE HAVING PIVOTING CLAMP

CROSS-REFERENCE TO RELATED APPLICATIONS

This application is a continuation application under 35 U.S.C. § 120 of U.S. patent application Ser. No. 15/699,610, filed Sep. 8, 2017, which claims priority under 35 U.S.C. § 119 to U.S. Provisional Patent Application No. 62/393,905, filed on Sep. 13, 2016 the contents of all of which are expressly incorporated herein by reference in their entireties.

TECHNICAL FIELD

The present disclosure is directed to a key duplication machine and, more particularly, to a key duplication machine having a pivoting clamp for securing key blanks during cutting.

BACKGROUND

An existing key can be duplicated by measuring a profile of the existing key and copying that profile within a corresponding key blank. The key blank generally has a size and shape larger than the master key, so that the key blank can be machined (e.g., cut and/or milled down) to function like the existing key. During machining, the key blank is mounted into a clamp and held stationary. The measured profile is then used to reproduce a corresponding pattern of notches within the key blank, thereby replicating the existing key.

Conventional clamps found within key making machines include a door that is forced toward a base or anvil, such that a portion of the key blank is sandwiched therebetween. Although the conventional clamps may be adequate for some situations, they can also be problematic. For example, during engagement with the key blank, it may be possible for the door to push the key blank partway out of the key making machine before the key is securely sandwiched between the door and the anvil. When this occurs, the key blank may be machined incorrectly, causing the duplication process to fail.

The disclosed key duplication machine and clamp are directed to overcoming one or more of the problems set forth above and/or other problems of the prior art.

SUMMARY

In one aspect, the present disclosure is directed to a clamp for a key making machine. The clamp may include an anvil, and a door movable toward the anvil to sandwich a key blank therebetween. The clamp may also include a gate pivotally connected to the door and configured to engage the key blank.

In another aspect, the present disclosure is directed to a key making machine. The key making machine may include a housing having a first opening configured to receive an existing key, and at least a second opening configured to receive at least one key blank. The key making machine may also include an imaging system located within the housing and configured to capture an edge profile of the existing key, and at least one fabrication module configured to cut the edge profile into the at least one key blank. The key making machine may further include a clamp located within the fabrication module and being configured to secure the at least one key blank during cutting of the edge profile. The clamp may include an anvil, and a door having a T-shaped recess formed at a lower end adjacent the anvil and guide channels formed at opposing sides that are configured to engage the housing. The door may be moveable toward the anvil to sandwich the at least one key blank therebetween. The clamp may also include a gate pivotally connected to the door and configured to engage the at least one key blank. The gate may have a T-shaped frame supported within the T-shaped recess, and a piston extending inward from the gate and configured to engage the at least one key blank. An end surface of the piston may extend a greater distance toward the at least one key blank at an inner edge than at an outer edge.

In yet another aspect, the present disclosure is directed to a method of clamping a key blank within a machine for cutting of notches within the key blank. The method may include receiving the key blank to be cut within the machine, and biasing a door toward a beveled surface of an anvil to sandwich the key blank between a lower edge of the door and the anvil. The biasing causes a gate to pivot and thereby push the key blank further into the machine.

DETAILED DESCRIPTION

Figure 1:
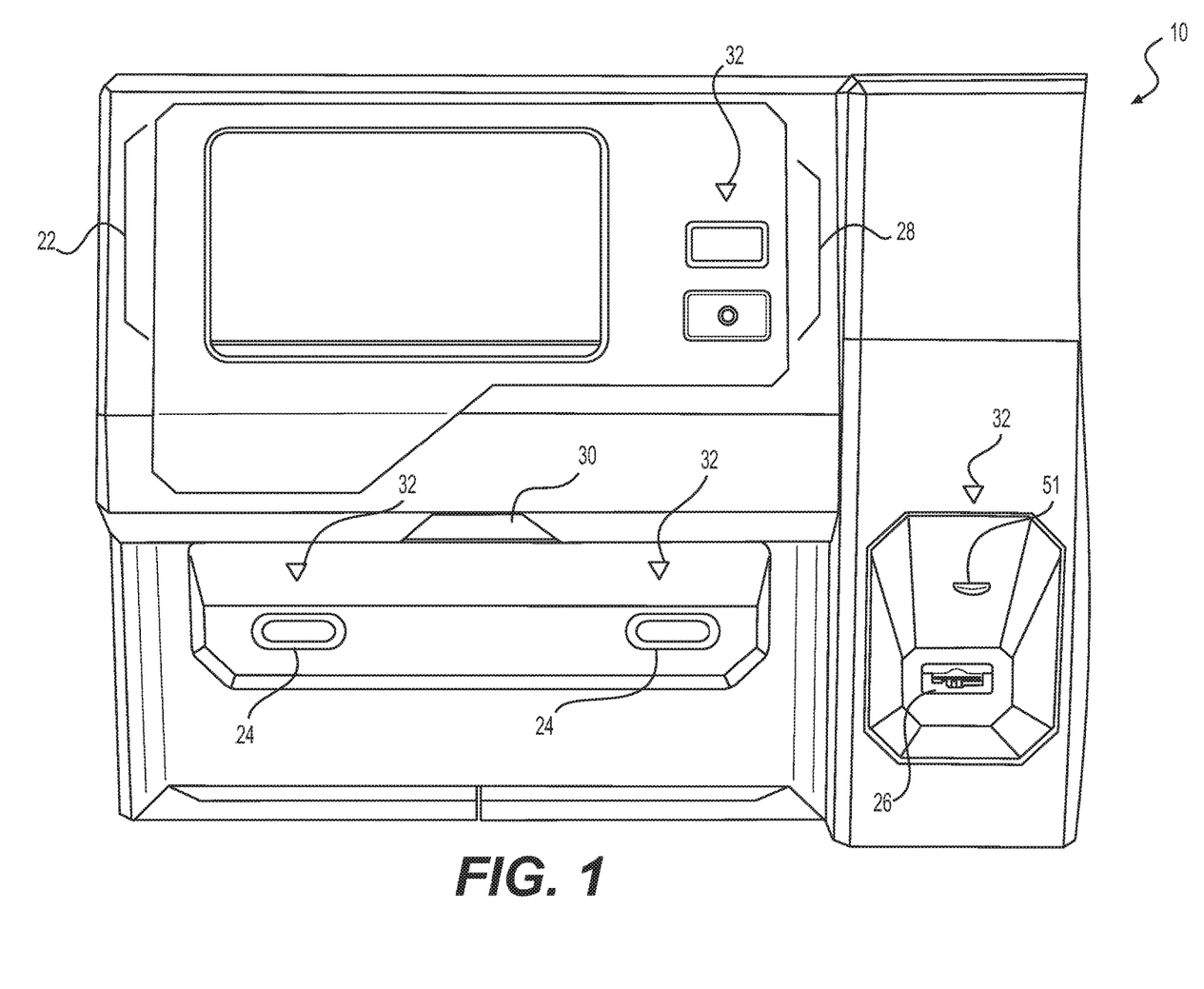
FIG. 1 is an front-view illustration of an exemplary disclosed key making machine.

FIG. 1 illustrates an exemplary key making machine ("machine") 10 that can be used to fabricate a copy of an existing key from a corresponding key blank. Machine 10 may include, among other things, a centralized display 22, one or more key blank slots ("slots") 24, one or more existing key slots ("slots") 26, a transponder section 28, and a reader 30. Following queues provided via display 22, a user may insert an existing key into slot 26 for identification and/or data capturing, and then insert corresponding key blanks into one or both of slots 24 for simultaneous fabrication of one or more new keys. Transponder section 28 may be used to detect and/or program transponders embedded within the existing key and/or the key blank. Reader 30 may be used to confirm that the key blank(s) are the correct key blank(s) corresponding to the existing key, and/or to charge the user for the key duplication process. One of more of slot(s) 24, slot 26, transponder section 28, and reader 30 may be provided with an indicator light 32 in close proximity that delivers additional queues to the user of machine 10.

Figure 2:
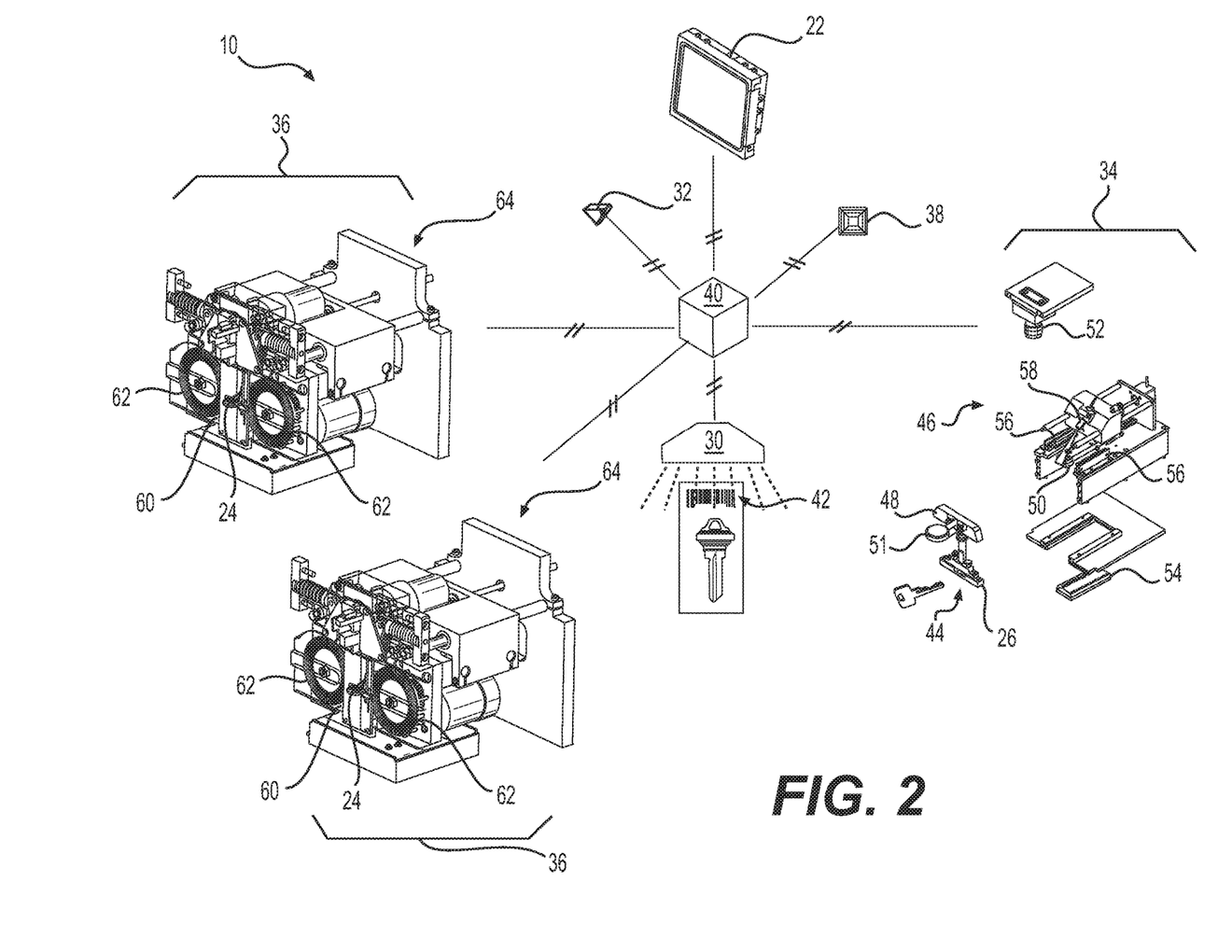
FIG. 2 is an exemplary disclosed control diagram of the key making machine of FIG. 1.

A diagrammatic illustration of machine 10 is provided in FIG. 2. As shown in this figure, machine 10 may be generally modular and include, among other things, an identification module 34 configured to receive the shank end of the existing key inserted through slot 26, any number of (e.g., two) fabrication modules 36 configured to receive the shank ends of key blanks inserted through slots 24, a transponder sensor/cloner 38 associated with transponder section 28, and a controller 40. Controller 40 may communicate with each of the other components, as well as with display 22, reader 30, and indicator light(s) 32 to regulate the key duplication process. Although the inter-component communications shown in FIG. 2 are illustrated as wired connections, it is contemplated that some or all of these communications could be wireless (e.g., Bluetooth, cellular, infrared, radio, Wi-Fi, etc.), if desired. It is further contemplated that machine 10 could be equipped with a router or cellular modem for communication with another machine 10, a back office, a service tool, etc.

As described above, display 22 may provide queues to the user of machine 10 regarding the key duplication process. These queues may include, among other things, when, where, and how to insert the existing key and the key blanks into machine 10. For example, display 22 may have a graphical user interface (GUI) that shows an image of the outside of machine 10, along with highlighting of the active slot(s) (i.e., slot(s) 24 and/or slot 26) that should be used for key insertion. In another example, controller 40 may correlate images on display 22 with illumination of particular indicator lights 32, thereby guiding the user to the correct slot. Further, a color, intensity, and/or frequency of light illumination may vary based on a degree of key insertion. For example, a particular indicator light 32 could initially illuminate in a red color, attracting the attention of the user to the corresponding slot. Then, as the user inserts the existing key or the key blank into that slot, the particular indicator light 32 could illuminate in a yellow color, followed by green when the key is fully and properly inserted. Other illumination strategies may also be employed.

In some embodiments, display 22 may additionally allow the user to input instructions, make selections, and/or answer questions regarding a desired duplication event. The instructions may include, for example, a number of duplicate keys to be produced, a desired pick-up time, a user's name, a desired delivery address, key identification information, a desire for duplication information to be stored for future reference, etc. The questions asked of the user may include for example, a make, model, and/or year of an associated car that the existing key corresponds with; a type and/or brand of lock to which the existing key belongs; and whether the existing key is a transponder key. The instructions, selections, and/or questions, as well as corresponding responses, may be communicated visually, audibly, and/or tactilely via display 22, as desired. For example, display 22 may be a touch screen and/or include another input device such as a key board, a mouse, a light pen, or a microphone that receives input from the user. Information received via display 22 may be directed to controller 40 for further processing, and controller 40 may respond to the customer via display 22.

Reader 30 may be configured to detect and read an index 42 associated with the key blanks. In one example, each index 42 is a unique barcode printed on a card to which each key blank is affixed, and corresponds with information stored in a memory of controller 40. For example, the barcode could correspond with an identity of the affixed key blank and/or a cost associated with using the affixed key blank in a duplication process. It is contemplated that the barcode (or another index 42) could alternatively be located directly on the key blank, if desired. Signals generated by reader 30 may be directed to controller 40 for comparison of the stored identity with an expected identity of a correct key blank. If the identity associated with index 42 does not correspond with the expected identity of the correct key blank, controller 40 may then cause display 22 to alert the user that the selected key blank is incorrect.

Identification module 34 may be configured to detect, identify, and/or measure distinguishing characteristics of the existing key inserted through slot 24. Although identification module 34 is shown in FIG. 2 as being co-located with fabrication module 36 within a common housing, it is contemplated that identification module 34 could alternatively be housed separately and positioned near (e.g., adjacent and facing in the same or another direction as) or remote from fabrication module 36, as desired. Identification module 34 may include, among other things, a key receiving assembly 44 and an imaging system 46. Key receiving assembly 44 may be configured to clamp an existing key in a particular orientation (e.g., lying horizontally with the shank thereof pointed inward toward the module) and at a particular location. Imaging system 46 may be configured to generate images of the existing key (or portions thereof) after it is received within key receiving assembly 44, and to direct data associated with the images to controller 40.

An exemplary embodiment of key receiving assembly 44 is shown in FIG. 2 as having a clamp 48 located immediately adjacent slot 26, and a guide 50 positioned at a side of clamp 48 opposite slot 26. Each of these components may cooperate to receive the existing key as the existing key is inserted by the user shank-first through slot 26. For example, side edges of slot 26 may be beveled inward toward a general center such that, as the existing key is inserted, the head of the existing key may engage the bevels and be urged toward the center (i.e., toward greater alignment with guide 50). Guide 50 may slide from clamp 48 inward to a desired imaging position during and/or after insertion of the existing key through slot 24. Clamp 48 may be spring-biased to secure the existing key in place during imaging, and a mechanical advantage may be provided to help reduce the effort required from the operator to insert the existing key through slot 26. In the disclosed embodiment, the mechanical advantage is provided by way of a lever arm 51.

Imaging system 46 may be a vision-based system employing one or more sources of visible and/or invisible light, and a receiver. The receiver may be, for example, a camera 52 that is located to any side of the existing key during imaging. Camera 52 may be configured to capture images of the existing key, while the light sources are selectively turned on and off. In the disclosed example, the light sources are "back lights" 54 configured to shine directly or indirectly toward the existing key from a side opposite (e.g., from below) camera 52. Camera 52, at this time, may capture a silhouette image of the existing key showing an exterior edge outline of the existing key and a location of reference features of the existing key (e.g., of shoulders and/or a tip of the existing key). Signals generated by camera 52 may be directed to controller 40 for further processing.

In another example, imaging system 46 may include one or more "side lights" 56 and/or a laser 58. Side lights 56 may be configured to shine light onto the existing key, one at a time, from an oblique side angle. During activation of each side light 56, camera 52 may be used to generate an image of the existing key showing an interior edge outline of notches milled into a center of the existing key. Laser 58 may be configured to scan the existing key while camera 52 generates one or more transverse stripe images. These additional signals generated by camera 52 may also be directed to controller 40 for further processing.

Each fabrication module 36 may include, among other things, a receiving unit 60, and one or more cutting wheels 62 movable relative to receiving unit 60 via a gantry 64. The key blank retrieved by the user based on image data captured via identification module 34 may be inserted through slot 24 into receiving unit 60. After being accepted by the corresponding receiving unit 60 (e.g., after the shank end of the key blank has passed through slot 24), cutting wheel(s) 62 and gantry 64 may be selectively activated to produce desired features within the key blank.

Receiving unit 60 may have any configuration known in the art for receiving, clamping, and/or positioning the inserted key blank relative to cutting wheels 62. In one embodiment, receiving unit 60 includes jaws that are spring-biased toward each other to sandwich the key blank therebetween, and/or a clamp that is movable to secure the key blank once positioned. In some embodiments, a sensor may be used to measure a shank length of the key blank during insertion, the length being subsequently used by controller 40 as a way to confirm proper placement of the key blank. Once the key blank has been placed at a desired cutting location, the clamp may be actuated to push down on only the key blank. Thereafter, the jaws may be completely withdrawn from the key blank, exposing the shank of the key blank to cutting wheels 62.

Cutting wheels 62 may be used to make notches in one or both shank edges of the key blank. During fabrication of the notches, one or more motors connected to cutting wheels 62 may be selectively activated, and a lead screw of gantry 64 may be driven in an X-direction to move cutting wheels 62 into and out of the shank along the length or Y-direction of the key blank. The amount of movement in the X-direction at a given position in the Y-direction may be controlled based on the pattern of existing notches measured in the existing key by identification module 34. For a singled-edge key, only one of cutting wheels 62 may be used at one side of the key blank. For a dual-edge key, both cutting wheels 62 may be used at the same time or at different times to create notches in opposing sides of the key blank. It is contemplated that some fabrications modules 36 may have only one cutting wheel 62, while other fabrication modules 36 may include the two cutting wheels 62 described above. In particular, some systems may be designed to cut only a single edge into a key blank, while other systems may be designed to cut dual edges. In fact, it may be possible for a single fabrication module 36 to include both types of systems. Any configuration may be possible.

As discussed above, it may be possible for the existing key that the user wishes to duplicate to be embedded with or otherwise include a transponder that enables activation of an associated lock (e.g., an ignition lock in a vehicle). In these situations, it may be desirable to code a new duplicate key (i.e., the key blank notched by machine 10) to match the existing key with the same transponder code to ensure that the duplicate key functions in the same manner as the existing key. In the disclosed embodiment, the transponder code in the existing key can be detected and read at sensor/cloner 38. And after fabricating notches into the shank of the appropriate key blank, the same code may be cloned within the transponder of the new key at sensor/cloner 38. In the disclosed embodiment, sensing and cloning are performed by the same device and at the same location on machine 10. It is contemplated, however, that different devices located together or separately may alternatively be used to perform these functions, if desired.

Controller 40 may embody a single microprocessor or multiple microprocessors that include a means for controlling operations of machine 10. Numerous commercially available microprocessors can be configured to perform the functions of controller 40. Controller 40 may include all the components required to run an application such as, for example, a memory, a secondary storage device, and a processor, such as a central processing unit or any other means known in the art for controlling display 22, reader 30, indicator lights 32, identification module 34, fabrication module(s) 36, and transponder sensor/cloner 38. Various other known circuits may be associated with controller 40, including power supply circuitry, signal-conditioning circuitry, solenoid driver circuitry, communication circuitry, switching circuitry, and other appropriate circuitry.

In some embodiments, machine 10 may also include a means for receiving payment from the user. These means may include, for example, a coin operated mechanism, a bill receiver, a credit card reader, and/or a receipt reader (e.g., a barcode reader configured to recognize a previous payment having already been received at another location and/or time). The means for receiving payment may be located anywhere on machine 10, and be capable of directing signals associated with the payment to controller 40 (or elsewhere) for further processing.

Figure 3:
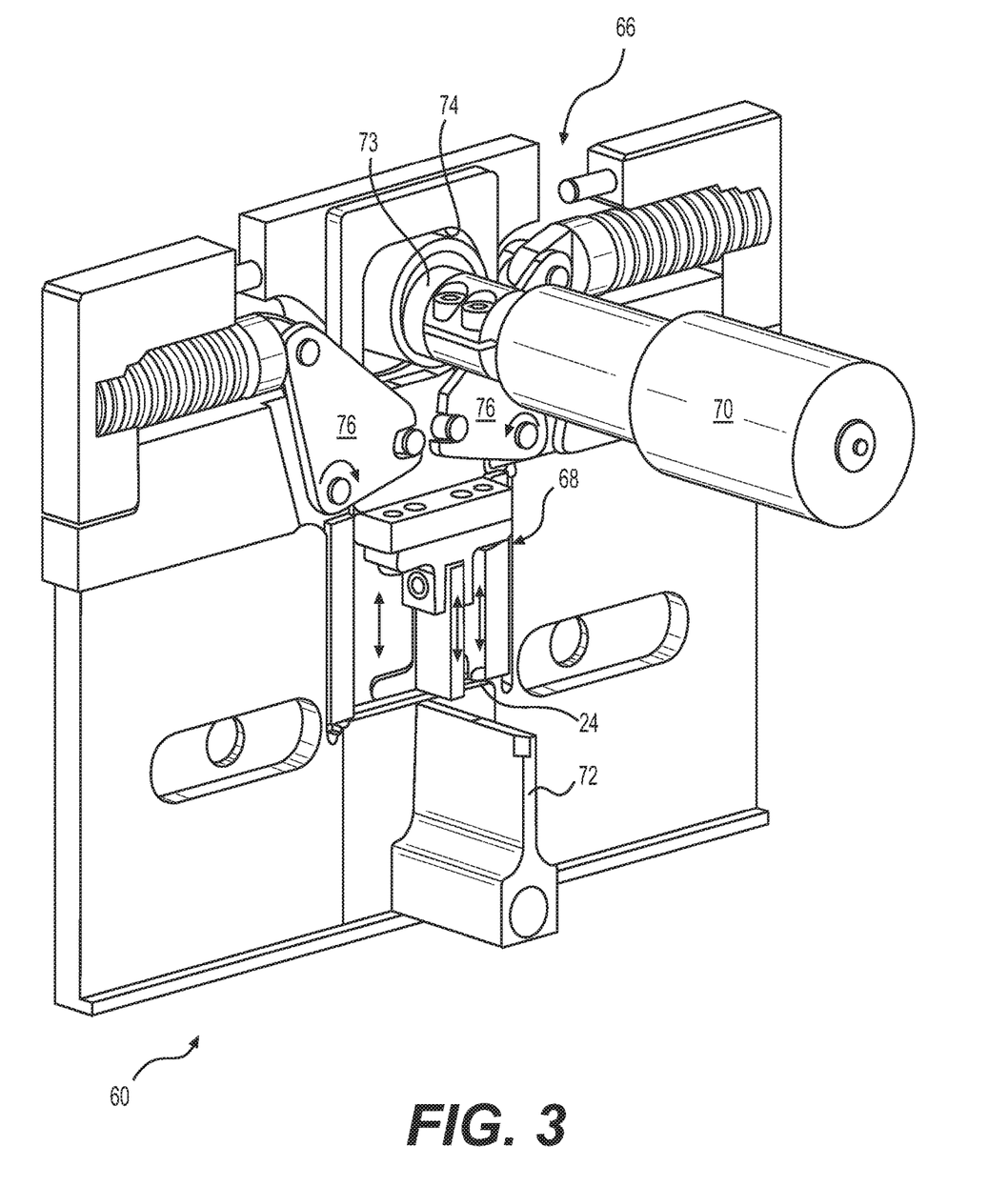
FIG. 3 is an internal perspective view illustration of an exemplary disclosed clamp that may be used in conjunction with the key making machine of FIGS. 1 and 2.

FIG. 3 illustrates an exemplary receiving unit 60, from a perspective inside of fabrication module 36. From this perspective, receiving unit 60 is shown to include an exemplary clamp 66 that secures a key blank inserted into machine 10 via slot 24. Clamp 66 may include, among other things, a door assembly 68, which is selectively moved downward by a motor 70 to press the key blank against a lower support (also known as an anvil) 72. In this embodiment, motor 70 includes a cam lobe 73 connected to a shaft thereof and positioned within an opening 74 of door assembly 68. As motor 70 rotates, the shape of cam lobe 73 may cause door assembly 68 to raise or lower, thereby releasing or clamping the key blank. Door assembly 68 may be spring biased toward a closed position (e.g., by way of one or more levers 76 that are connected to opposing sides of door assembly 68), and moved toward the open position by motor 70. One or more sensors (not shown) may be associated with clamp 66 to monitor the position of door assembly 68 and/or motor 70, as desired.

Figure 4:
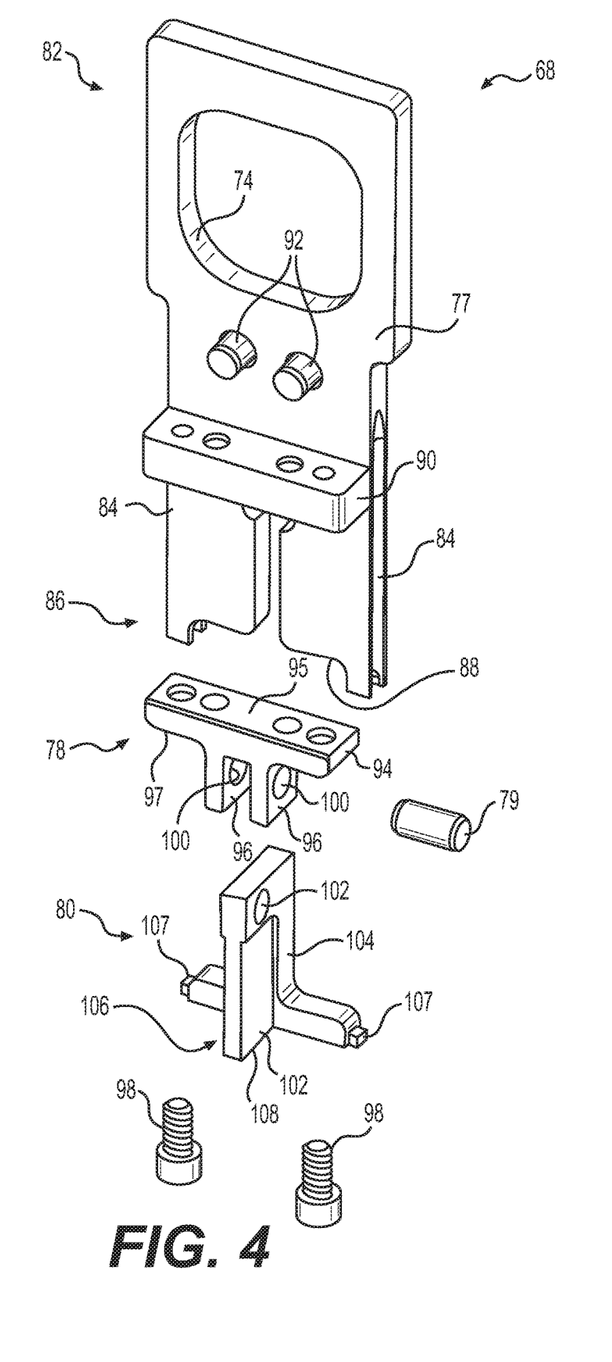
FIGS. 4 and 5 are exploded and cross-sectional view illustrations, respectively, of exemplary disclosed portions of the clamp of FIG. 3.
Figure 5:
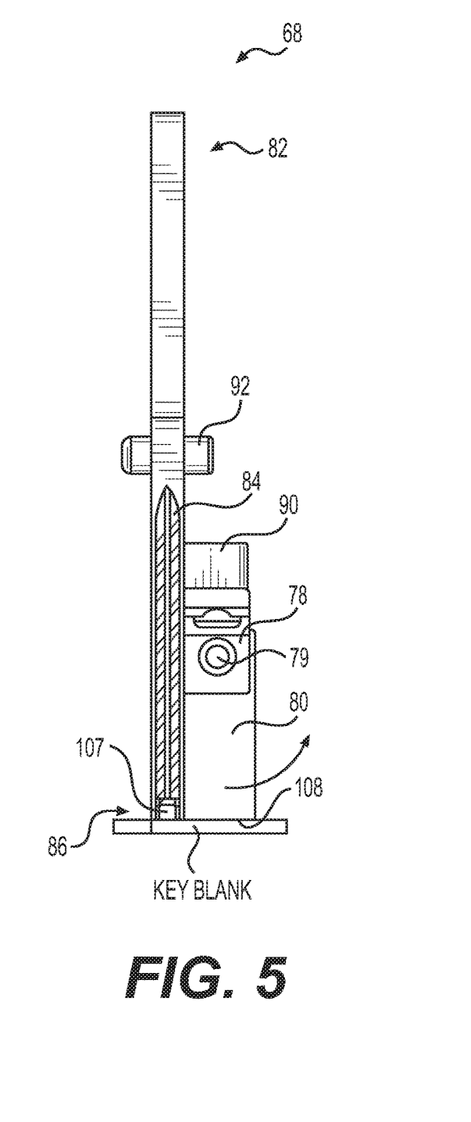

As seen in FIGS. 4 and 5, door assembly 68 may include multiple components that cooperate to generate pressure on the key blank when door assembly 68 is pushed downward by levers 76. These components may include, among other things, a generally plate-like base 77, a clevis 78, a pin 79, and a gate 80 pivotally connected to base 77 via clevis 78 and pin 79. Base 77 may have opening 74 formed within an upper end 82, and vertical channels 84 at sides thereof that function as guide rails to engage a housing of fabrication module 36 during opening and closing movements of door assembly 68. A lower end 86 of base 77 may be configured to push the key blank against anvil 72, and include a transverse recess 88 formed therein. Recess 88 may have a generally upside-down T-shape, with a wider shallow portion at lower end 86 and a narrower stem portion that extends upward toward upper end 82 from a transverse center of the shallow portion. A mounting shelf 90 may protrude inward from base 77 at a location between upper and lower ends 82, 86 (e.g., from a distal end of the stem portion of recess 88). Shelf 90 may be integral with base 77 or fabricated separately and subsequently joined to base 77 (e.g., via welding or brazing), as desired. One or more generally cylindrical (e.g., frustoconical) anchor points 92 may also protrude inward from base 77 at a location between upper end 82 and shelf 90. Anchor points 92 may function as pivot axes for levers 76 (referring to FIG. 3).

Clevis 78 may function as a pivot bracket for pivotally connecting gate 80 to base 77 via pin 79. In particular, clevis 78 may include a mounting plate 94 having an upper surface 95 configured to engage an underside of shelf 90, and two integral and spaced-apart tabs 96 that extend downward in a vertical direction from a lower surface 97. Mounting plate 94 may be connected to shelf 90 by way of one or more fasteners 98. Pin 79 may pass transversely through holes 100 formed within tabs 96 and also through a corresponding hole 102 formed in gate 80, to thereby allow gate 80 to pivot relative to clevis 78 and base 77 about pin 79.

Gate 80 may have a generally T-shaped frame 104 configured to fit with the upside-down T-shaped recess 88 of base 77, such that gate 80 may translate vertically with base 77 under the influence of motor 70 and/or levers 76 (referring to FIG. 3). Gate 80 may be connected to base 77 by way of pin 79 in the manner described above, and include a piston 106 integrally formed below hole 102 and inward of frame 104. Frame 104 may fit loosely within recess 88, such that a pivoting motion of gate 80 inward and outward relative to base 77 may be possible. One or more motion limiters 107 may be formed at opposing transverse ends of frame 104 to engage corresponding openings in base 77 and thereby function to limit the pivoting motion.

Piston 106 may have a generally rectangular cross-section and be configured to engage a portion of the inserted key blank during the pre-machining clamping described above. In particular, the cross-section of piston 106 may have a length direction and a width direction, and the length direction may be generally aligned with a shank of the key blank when it is inserted into slot 24 below piston 106. A lower horizontal surface 108 of piston 106, which is configured to engage the key blank, may not be perfectly perpendicular relative to vertical surfaces of gate 80 and/or base 77. In particular, the lower surface may be beveled slightly, such that a distal inner edge of the cross-section of piston 106 extends downward farther than an outer edge adjacent base 77. With this configuration, the downward motion of gate 80 may cause the inner edge to engage the key blank first, thereby creating a counter-clockwise moment about pin 79 (counter-clockwise relative to the perspective of FIG. 5) that causes gate 80 to pivot. The counter-clockwise motion may help to push the key blank fully into (and/or to retain the key blank at a correct position inside of) fabrication module 34.

Figure 6:
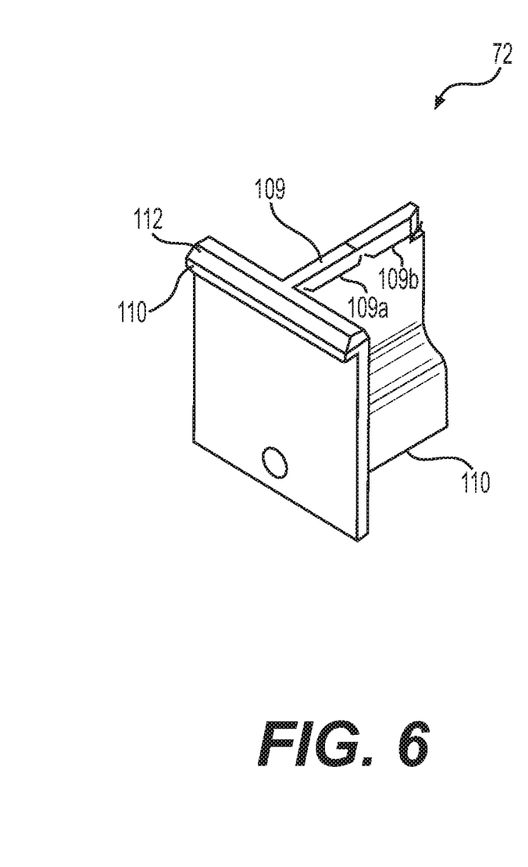
FIGS. 6 and 7 are perspective and side-view illustrations, respectively, of an exemplary disclosed anvil that may form a portion of the clamp of FIG. 3.
Figure 7:
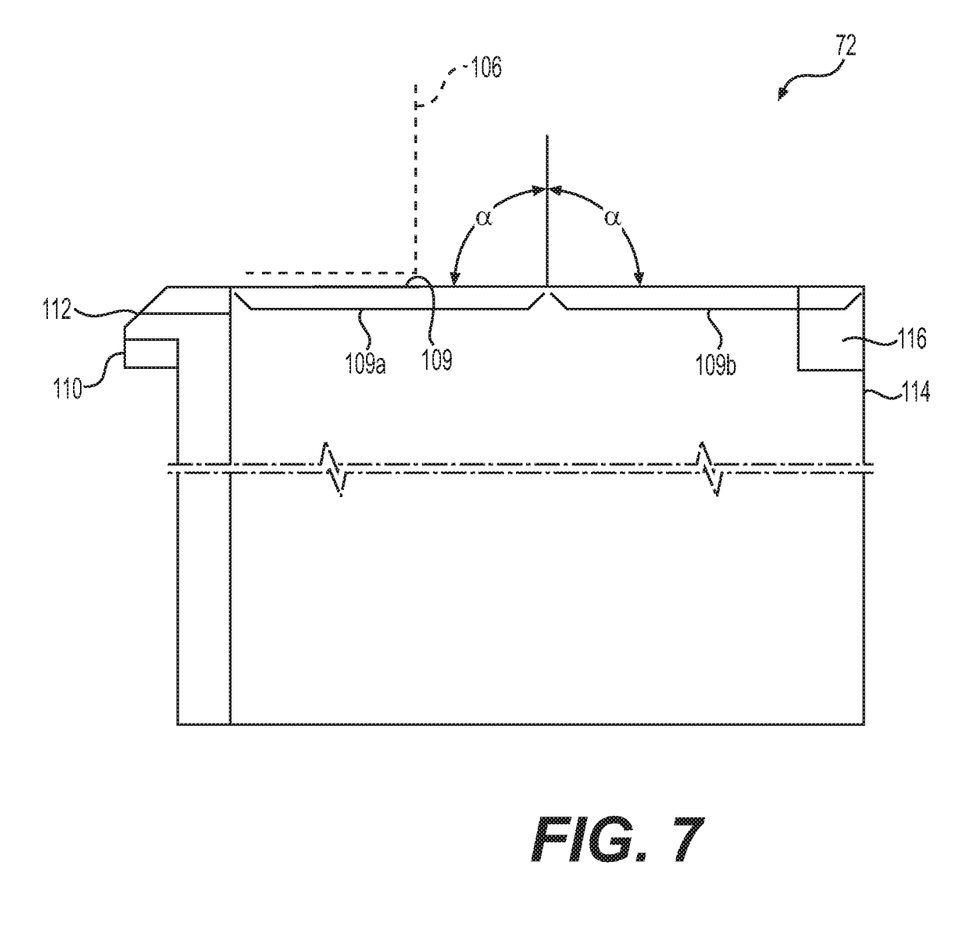

FIGS. 6 and 7 illustrate an exemplary anvil 72 having unique features that are configured to cooperate with gate 80 and help secure the key blank during machining. These features may include, for example, a generally T-shaped cross-section having a double-beveled upper surface 109. The T-shaped cross-section of anvil 72 may be configured to generally align with (e.g., mate against) the T-shaped cross-section of gate 80, such that the two cross-sections may be pressed toward each other and sandwich the key blank therebetween. Upper surface 109 may be located on a longer center leg of the T-shape, and divided into a first portion 109a near an intersection with the remaining shorter leg and a second portion 109b at a distal end of the center leg. Each of first and second portions 109a, 109b may be flat and beveled downward toward each other, such that an intersection of these portions is located lower (i.e., farther from piston 106) than opposing ends. In one embodiment, an internal angle α of the bevel measured between a vertical reference line and first and second portions 109a, 109b may be about 89.5° to about 89.8°. In this embodiment, the internal angle α associated with first portion 109a may be larger than the internal angle α associated with second portion 109b. This bevel may provide a space below the key blank for piston 106 to deflect the key blank downward during clamping, thereby increasing a clamping load on the key blank. A leading horizontal edge 110 of anvil 72 (i.e., of the shorter leg) may have a chamfer 112 that helps to ease entry of the key blank into slot 24. An upper tip of a trailing edge 114 may have a similar chamfer 116 to provide clearance for other components of fabrication module 34. A base 118 of anvil 72 may flare transversely outward to provide support for a lead screw of gantry 64 (referring to FIG. 2).

INDUSTRIAL APPLICABILITY

The disclosed key making machine 10 may allow for greater precision in the key making process. In particular, the disclosed clamp may help to ensure proper positioning of a key blank prior to cutting of notches within the key blank. In addition, the disclosed clamp may provide a secure hold on the key blank during cutting.

To begin the duplication process, a customer or sales associate may insert an existing key of any configuration through slot 26 of identification module 34. In some embodiments, this action may be the very first action taken in the process and, by initiating this action, wake (i.e., trigger activation of) the associated machine 10. As the existing key is inserted through slot 26, the head of the existing key may engage the beveled surfaces of slot 26, while the tip of the existing key engages guide 50. At this time, movement of the existing key in through slot 26 may cause the tip of the existing key to push guide 50 away from slot 26. This motion may continue until the head of the existing key is seated properly inside of the mouth of slot 26. This engagement may cause the head of the existing aster key to align with guide 50 in preparation for imaging.

After the shank of the existing key is inserted into identification module 34, camera 52 may be triggered to capture one or more images of only the shank of the existing key. The images, as described above, may include a backlight image, one or more sidelight images, and/or a laser scan image. These images may show a location of the tip of the key, a profile of the shank, and a location of shoulders at a base of the key's head (if shoulders are present).

Based on the backlight image (i.e., based on the silhouette of the existing key), it may be determined if the existing key is an edge-cut key, a side-mill key, or in some embodiments simply a key that cannot be duplicated with machine 10. In one example, these determinations may be made based on the edge profile of the existing key, as captured in the backlight image. Specifically, if the edge profile is a straight profile, then it may be classified as a side-mill key. Otherwise, it may be classified as an edge cut key. In another example, the master key may be identified as a particular one of a plurality of known keys (e.g., key #66) and, based on the identification, reference a lookup map stored in memory to determine the class of key (edge-cut or side-mill) that it is and if it can be duplicated by machine 10. The backlight image, when the existing key is an edge cut key, may also be used to measure a profile of the biting edge(s) of the key. It is contemplated that, in some embodiments, the step of determining the type of key inserted into identification module 34 may be omitted, and machine 10 may be capable of cutting only one type of key (e.g., only edge cut keys).

When it is determined that the existing key is an edge-cut key, the laser scan image may be used to identify and/or measure a channel profile of the existing key (i.e., the shapes, sizes, and/or locations of channels) in a manner known in the art. In some embodiments, capturing of the laser scan image may only be made after determination that the existing key is an edge-cut key. In other embodiments, the laser scan image may always be captured.

When it is determined that the existing mater key is a side-mill key, the sidelight images may be used together to determine the side-mill profile of the existing key. In particular, each side light may be selectively turned on, one at a time, to capture an inner edge profile. Specifically, by shining the side light across the surface of the existing key, a shadow may be created. By capturing an image at this time, a pattern at a surface of existing key becomes visible. As with the laser-scan image described above, it is contemplated that the sidelight images may always be captured by identification module 34 or only captured in response to classification of the existing key as a side-mill key.

The customer and/or associate may be instructed (e.g., via display 22) to retrieve the appropriate key blank and then insert the retrieved key blank into slot 24 of fabrication module 36. As the shank of the appropriate key blank is being inserted by slot 24 of fabrication module 36, the key blank may be mechanically aligned by the insertion. In some embodiments, an identity of the key blank may first be confirmed (e.g., via interpretation of index 42 by reader 30) prior to insertion of the key blank into slot 24. If an inconsistency is detected at this point in time, the process may be prematurely halted.

It is contemplated that the identity of the key blank inserted into fabrication module 36 may be confirmed without use of index 42, if desired. For example, it may be possible to determine the identity of some key blanks based on characteristics of their heads (e.g., an outer profile, an eyelet shape, etc.). It is also contemplated that these characteristics could be used in conjunction with index 42 and/or a measured length of the key blank, if desired.

Once the correct key blank has been properly placed through slot 24, motor 70 may rotate cam lobe 73 to release door assembly 68, base 77 and gate 80 to move downward toward anvil 72 and sandwich the key blank therebetween. As gate 80 moves downward, the inner edge of piston surface 108 may engage the head of the key blank first. Because of the angled nature of surface 108, further downward movement may generate a moment about pin 79, causing piston 106 to pivot inward until motion limiters 107 engage corresponding features of base 77. This pivoting motion of piston 106 may function to force the key blank further inward into fabrication module 36, just prior to the key blank being fully secured by clamp 66. Precision cutting of the key blank may then begin.

It will be apparent to those skilled in the art that various modifications and variations can be made to the disclosed key making machine and clamp. Other embodiments will be apparent to those skilled in the art from consideration of the specification and practice of the disclosed key making machine and clamp. It is intended that the specification and examples be considered as exemplary only, with a true scope being indicated by the following claims and their equivalents.

What is claimed is:

1. A clamp for a key making machine, comprising:
    an anvil;
    a door movable toward the anvil to sandwich a key blank therebetween, the door including:
        a T-shaped recess formed at a lower end adjacent the anvil; and
        an inwardly extending mounting shelf located at a stem-end of the T-shaped recess, between an upper end and the lower end;
    a gate pivotally connected to the door and including a T-shaped frame supported within the T-shaped recess, and a piston extending inward from the gate and configured to engage the key blank;
    a clevis connected to the door, the clevis including:
        a mounting plate connected to the inwardly extending mounting shelf; and
        spaced-apart tabs configured to receive a corresponding portion of the gate therebetween; and
    a pin passing through the gate and the clevis.

2. The clamp of claim 1, wherein:
    the piston has a generally rectangular cross-section, with a length and a width; and
    an end surface of the piston extends a greater distance toward the key blank at an inner edge than at an outer edge.

3. The clamp of claim 2, wherein the gate further includes motion limiters extending from opposing ends of the T-shaped frame that are configured to engage the door and limit pivoting of the gate.

4. The clamp of claim 1, further including at least one spring-biased lever arm pivotally connected to the door at an upper end opposite the anvil.

5. The clamp of claim 4, wherein:
    the door includes an opening formed in the upper end of the door; and
    the clamp further includes a motor having a lobed cam configured to engage the upper end of the door.

6. The clamp of claim 5, wherein:
    the at least one spring-biased lever arm is configured to urge the door toward a closed position; and
    the motor is configured to move the door to an open position.

7. The clamp of claim 1, wherein the anvil is generally T-shaped.

8. The clamp of claim 7, wherein:
    the anvil has a shorter leg and a longer leg extending from a center of the shorter leg;
    an upper surface of the longer leg is configured to engage the key blank; and
    the upper surface is beveled away from the door at a general center.

9. The clamp of claim 8, wherein:
    the upper surface is divided into a first flat portion adjacent the shorter leg, and a second flat portion away from the shorter leg; and
    an interior angle between a vertical dividing line of the first and second flat portions and the first flat portion is greater than an interior angle between the vertical dividing line and the second flat portion.

10. The clamp of claim 8, wherein an outer edge of the shorter leg is chamfered.

11. The clamp of claim 8, wherein the longer leg has a base that flares transversely outward to provide support for a gantry lead screw.

12. The clamp of claim 1, wherein the door includes guide channels formed at opposing sides that are configured to engage a housing of the key making machine.

13. A clamp for a key making machine, comprising:
    a T-shaped anvil, including a shorter leg and a longer leg extending from a center of the shorter leg, wherein the longer leg includes an upper surface, including:
        a first flat portion adjacent the shorter leg; and
        a second flat portion away from the shorter leg, wherein an interior angle between a vertical dividing line of the first and second flat portions and the first flat portion is greater than an interior angle between the vertical dividing line and the second flat portion;

a door movable toward the anvil to sandwich a key blank therebetween; and a gate pivotally connected to the door and configured to engage the key blank.

14. The clamp of claim 13, wherein the longer leg has a base that flares transversely outward to provide support for a gantry lead screw.

15. The clamp of claim 13, wherein the door includes guide channels formed at opposing sides that are configured to engage a housing of the key making machine.

16. The clamp of claim 13, wherein:

the door includes a T-shaped recess formed at a lower end adjacent the anvil; and the gate has a T-shaped frame supported within the T-shaped recess, and a piston extending inward from the gate and configured to engage the key blank.

17. The clamp of claim 16, further including:

a clevis connected to the door; and a pin passing through the gate and the clevis.

18. The clamp of claim 17, wherein:

the door includes an inwardly extending mounting shelf located at a stem-end of the T-shaped recess, between an upper end and the lower end; and the clevis includes a mounting plate connected to the inwardly extending mounting shelf, and spaced-apart tabs configured to receive a corresponding portion of the gate therebetween.

19. A clamp for a key making machine, comprising:

a T-shaped anvil, including a shorter leg and a longer leg extending from a center of the shorter leg, wherein the longer leg includes an upper surface beveled away from the door at a general center and configured to engage a key blank, and an outer edge of the shorter leg is chamfered;

a door movable toward the anvil to sandwich a key blank therebetween; and a gate pivotally connected to the door and configured to engage the key blank.

20. The clamp of claim 19, wherein:

the door includes a T-shaped recess formed at a lower end adjacent the anvil; and the gate has a T-shaped frame supported within the T-shaped recess, and a piston extending inward from the gate and configured to engage the key blank.

* * * * *